United States Patent [19]
Kitamoto et al.

[11] 3,843,292
[45] Oct. 22, 1974

[54] A DEVICE FOR CASTING TIRES

[75] Inventors: Yoshiyuki Kitamoto; Makoto Tanaka; Nobuya Yoshimura, all of Tokyo, Japan

[73] Assignee: Bridgestone Tire Company Limited, Tokyo, Japan

[22] Filed: June 7, 1972

[21] Appl. No.: 260,541

[30] Foreign Application Priority Data
June 18, 1971 Japan.............................. 46-43347

[52] U.S. Cl.................... 425/242, 425/13, 425/35, 425/43, 425/53, 264/315
[51] Int. Cl.......... B29f 1/00, B29h 5/18, B29h 5/04, B29h/17/36; B29c 5/00
[58] Field of Search.............................. 425/13, 17, 425/35, 44, 43, 242, 51, 53; 249/65; 18/42 T

[56] References Cited
UNITED STATES PATENTS

| | | | |
|---|---|---|---|
| 1,270,345 | 6/1918 | Tew | 425/53 |
| 1,289,773 | 12/1918 | Hopkinson | 425/44 |
| 1,289,774 | 12/1918 | Hopkinson | 425/44 |
| 1,319,770 | 10/1919 | Hargraves | 425/53 |
| 1,429,693 | 8/1922 | Raflovich | 425/43 |
| 1,665,440 | 4/1928 | Brubaker | 425/43 X |
| 1,871,120 | 8/1932 | Denmire | 425/44 X |
| 2,582,715 | 1/1952 | Murray | 425/53 |
| 2,623,261 | 12/1952 | Semeraro | 249/65 |
| 2,700,180 | 1/1959 | Mackay | 425/43 |
| 2,724,425 | 11/1959 | Ostling | 48/42 T UX |
| 2,873,790 | 2/1959 | Eadwell et al. | 18/42 T UX |
| 3,104,441 | 9/1963 | Smith | 249/65 |
| 3,192,570 | 7/1965 | Branick | 425/49 X |
| 3,459,849 | 8/1969 | Ronde | 264/255 |
| 3,645,655 | 2/1972 | Beneze | 425/35 |
| 3,751,551 | 8/1973 | McGillvary | 425/435 X |

*Primary Examiner*—J. Howard Flint, Jr.
*Attorney, Agent, or Firm*—Fleit, Gipple & Jacobson

[57] ABSTRACT

A device for molding a pneumatic tire, by forming a molding cavity between an outer hard mold and a flexible hollow toroidal core, pouring a fluidized tire-forming material in the cavity while applying an internal pressure to the core, and releasing the internal pressure upon hardening of the tire-forming material.

8 Claims, 3 Drawing Figures

A DEVICE FOR CASTING TIRES

BACKGROUND OF THE INVENTION

1. Field of the Invention

This invention relates to a device for casting tires, and more particularly to a method and a device for casting pneumatic tires by pouring a fluidized high molecular compound material into the cavity of a mold, and solidifying the material thus poured.

2. Description of the Prior Art

Conventional pneumatic tires are made by a complicated process, which includes the formation of a green case by spreading a tire carcass made of vulcanizable rubber sheets, which are reinforced by fibrous cords or the like, and overlaying tread rubber layer thereon. The green case is then placed in a mold for shaping and vulcanized therein. In order to effectively carry out such a conventional tire-making process, a number of different steps must be carefully followed: namely, preparing rubber sheets or plies, cutting the rubber plies into a proper shape to form a green case, and shaping and vulcanizing the green case. As a means for simplifying the conventional tire-making process, it has been long proposed to make a pneumatic tire exclusively by casting.

For instance, U.S. Pat. No. 3,123,122, which was granted to Richard Beckadolph on Mar. 3, 1964, teaches a pneumatic street vehicle tire having a carcass-free tire body and a plurality of endless belt means located in grooves bored on the tread portion of the tire body. To facilitate the manufacture of such carcass-free tire body, U.S. Pat. No. 3,381,736 granted to Peter Ford et al. on May 7, 1968 teaches a molding process which is used together with a bead assembly comprising at least one turn of wire provided with a plurality of locating blocks, and U.S. Pat. No. 3,457,594 granted to Antoine Joseph Georges Baudou on July 29, 1969 teaches a mold to be used together with a retractable metallic core conforming to the inside shape of the tire and mounted between the shells of the tire in such a way that it can rotate inside the closed mold. The so-called cast tire or carcass-free tire, however, has not been used on practical scale.

Conventional tire materials are not strong enough for ensuring proper performance required for cast tires when they are used as automobile tires. Besides the material, conventional molding processes are not suitable for manufacturing the cast tire. One of difficulties experienced with the manufacture of the cast tire is handling of molding cores.

According to the aforequoted U.S. Pat. Nos. 3,381,736 and 3,457,594, a cast tire is made by pouring or injecting a suitable tire-making material, e.g., a fluidized high molecular substance, into a molding cavity, which is defined between an outer mold and a core disposed therein. The tire-making material is hardened in the cavity, so as to provide a desired cast tire. A suitable hardener may be added in the tire-making material before pouring it into the molding cavity. To accelerate hardening, a suitable treatment (thermal or chemical) may be applied to the material in the cavity. The dimensional accuracy of the molding cavity is of prime importance in making the cast tire, because the performance characteristics of the cast tire strongly depend on its wall thickness which is determined by the molding cavity dimension. Accordingly, high accuracy is required in making the core. On the other hand, the core is made of several separable sections for purposes of facilitating its removal from the inside of the cast tire. Assembling of the sections into one core for each casting or molding operation tends to cause dimensional inaccuracy of the core.

Assembling of a number of mutually separable sections into one core is a time-consuming operation, and it is difficult to ensure a high stability at the joint of different sections in the course of each casting or molding operation. Thus, the dimensional accuracy of cast tires made by a conventional mold assembly consisting of a multi-sectioned core and an outer mold has been rather poor.

Therefore, an object of the present invention is to obviate the aforesaid difficulties of the conventional process of manufacturing cast tires, by providing an improved device for making tires by casting.

SUMMARY OF THE INVENTION

According to the present invention, a flexible hollow core is used together with a hard outer mold, so as to form a molding cavity therebetween. The shape and dimensions of the core are accurately maintained throughout the molding operation, despite various mechanical and thermal stresses applied thereto during molding. The magnitude of such stresses varies at different stages of molding, from the time of pouring of the fluidized tire-making material to that of complete hardening of the material, but the core shape is accurately maintained irrespective of the stress variation. Furthermore, upon completion of hardening of the tire-making material, the flexible hollow core can be removed from the hardened cast tire without disassembling into subsections. The flexible hollow core, which is of a toroidal shell shape, comprises a pair of annular beads each being reinforced by an inextensible loop member and a toroidal shell made of one or more cord plies extending across the two annular beads. The flexible hollow core is placed in position within the molding cavity of a hard outer mold and a closing ring is applied to the core so as to close sealingly the space between the two beads of the core. Then, the inside of the core is pressurized, so that the outer peripheral surface of the core forms the inner surface of a cast tire to be molded thereby. The outer surface of the cast tire is shaped by the inner peripheral surface of the outer mold.

After pressurizing the inside of the hollow toroidal core, a suitable tire-making material is poured into the molding cavity defined between the outer peripheral surface of the core and the inner peripheral surface of the hard outer mold. The outer mold is preferably made of two halves which can be separated for purposes of easily removing the cast tire therefrom.

After the tire-making material is hardened in the molding cavity, the internal pressure of the core is released, and the closing ring and the core are separated from the outer mold, so as to remove the cast tire.

Each of the beads of the flexible hollow core is preferably made of cords or wires, which are looped in a substantially inextensible fashion. The cord ply or plies of the toroidal shell are so disposed that the opposite edges of the cord ply or plies are folded or turned about the corresponding beads, respectively. The cords of the toroidal shell may be made of rayon or other similar inextensible materials. A stiffener member made of hard rubber may be bonded to each of the beads, in such a manner that the stiffener member is enclosed by the folded edge portion and non-folded portion of the shell cords.

BRIEF DESCRIPTION OF THE DRAWING

For a better understanding of the invention, reference is made to the accompanying drawings, in which.

The same parts are designated by the same numerals throughout the different figures of the drawing.

DESCRIPTION OF THE PREFERRED EMBODIMENTS

Figure 1:
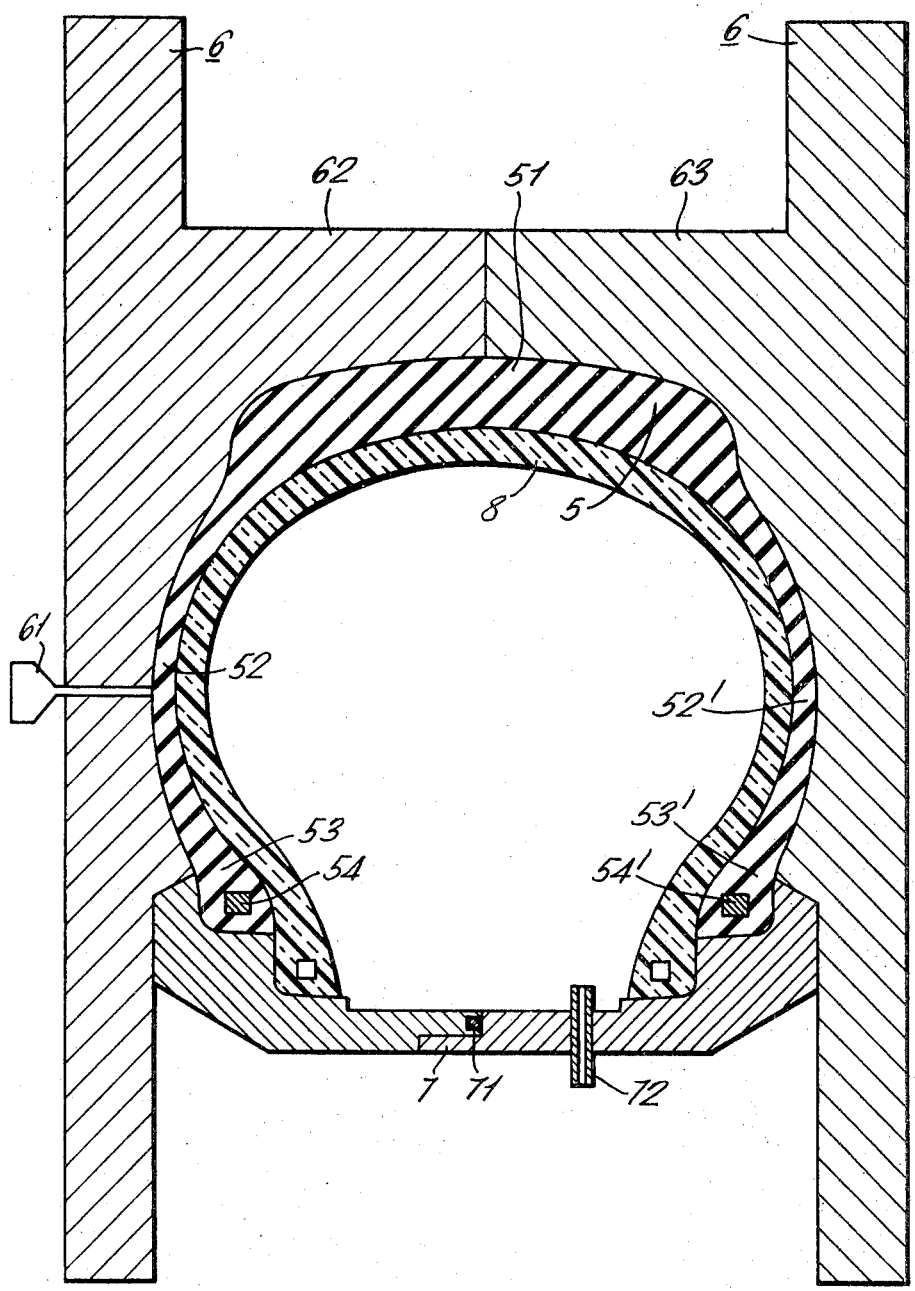
FIG. 1 is a schematic sectional view of a mold assembly of the present invention.

FIG. 1 shows a radial sectional view of a mold assembly, which is suitable for fulfilling the process according to the present invention. In the figure, a pneumatic tire 5 to be cast or molded by the mold assembly comprises a tread portion 51 and side walls 52 and 52', which side walls are connected to beads 53 and 53' reinforced by bead wires 54 and 54'. It should be noted that the entire cast tire 5 is made by molding and hardening a fluidized high molecular material, except the bead wires 54 and 54'. The fluidized high molecular material is, for instance, a suitable polymer based on polyurethane. For brevity, such fluidized high molecular material will be referred to as the "starting fluid material," hereinafter.

A molding cavity for shaping the cast tire 5 is defined between the inner peripheral surface of a hard outer mold 6 and the outer peripheral surface of a flexible hollow core 8. One or more pouring gates 61 are bored through the outer mold 6, so as to pour the starting fluid material into the molding cavity. To facilitate the removal of the cast tire 5, the outer mold 6 may be made of two halves 62 and 63, or three or more parts, which halves may be joined together along the equator of the cast tire, or along the outermost circumferential line about the center of symmetry of the tire.

The inner peripheral surfaces of the two halves 62 and 63 of the outer mold act to determine the outer surface of the cast tire 5 at the tread and side walls thereof.

The outer mold 6 is preferably made of a suitable metal, so as to provide a high mechanical strength against the mechanical and thermal stresses at the time of pouring the starting fluid material. An example of such metal for making the outer mold 6 is structural steel SS-41 according to Japanese Industrial Standard JIS G3101. It is, of course, possible to make the outer mold 6 with a suitable plastics material, provided that it has sufficient mechanical and thermal strength.

In the embodiment of FIG. 1, those surfaces of the bead portions 53 and 53' of the cast tire 5 which are to engage rim flanges and a rim base when being mounted on a tire-holding rim are defined by the corresponding inner surface of a ring mold 7. In FIG. 1, the ring mold 7 is also made of two halves which can be handled together with the two halves 62 and 63 of the outer mold 6. A suitable sealing member 71, e.g., an O-ring, is inserted between the two halves of the ring mold 7 at the joint thereof. With the sealing member 71, the inside pressure of the flexible toroidal hollow core 8 can be maintained at a desired level throughout the tire making operation.

A valve 72 is secured to the ring mold 7, as shown in FIG. 1, so as to force high-pressure gas into the hollow core 8 to keep it inflated during the tire making operation. The internal pressure of the hollow core 8 should be kept high enough during the molding operation for preventing the core 8 from being deformed by the mechanical and thermal stresses applied thereto during the molding. The high-pressure gas for providing such internal pressure is, for instance, compressed air.

Figure 2:
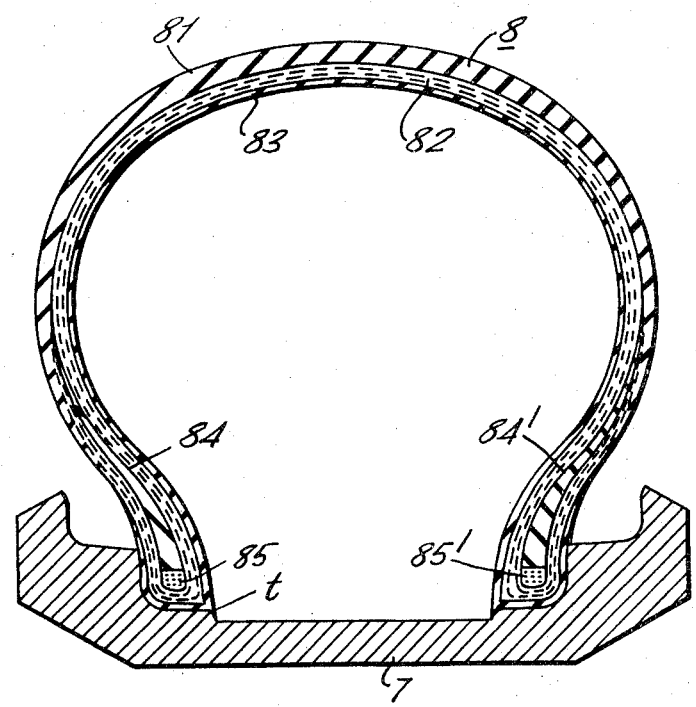
FIG. 2 is a sectional view of a flexible hollow core to be used in the mold assembly of FIG. 1.

Referring to FIG. 2, the hollow core 8 comprises a peripheral rubber layer 81, a flexible toroidal shell 82 having a reinforcing cord ply or plies, a lining layer 83, stiffeners 84, 84', and beads 85, 85'. The toroidal shell 82 of the illustrated embodiment includes two rubberized cord plies, which plies are, for instance, made of cords each consisting of two 1,650 denier rayon threads and having rubber coating. The cords of the two plies are biased in opposite directions relative to the equatorial direction of the toroidal core, or the outermost circumferential line about the center of symmetry of the core. For example, the cords of one reinforcing ply of the toroidal shell 82 are biased by an angle of 20° to 50°, preferably approximately 30°, relative to the equatorial direction of the core 8, while the cords of the other reinforcing ply of the shell 82 are biased by about 30° in the opposite direction to those of the first ply, relative to the aforesaid equatorial direction.

For certain applications, the cords of the reinforcing layers may be disposed at right angles to the equator of the core 8. In this case, an additional ply may be provided along the equator of the core 8, for reinforcing it in its circumferential direction. In other words, the last mentioned additional ply is a kind of belt extending along the hollow core periphery for preventing the hollow core from expansion.

Opposite edge portions of the reinforcing plies of the toroidal shell 82 extend through a space between the two beads 85, 85' and are folded back so as to enclose the two beads by the edge portions of the plies. Thereby, the two beads are securely fixed to the toroidal shell 82. Preferably, the folded back edge portions extend to that portion of the toroidal shell 82, where the width of the toroidal shell taken in parallel to the axis of rotation of a tire to be cast therein is maximum.

The cords of the reinforcing plies of the shell 82 are made of one or more of organic or inorganic fibers, natural or synthetic, such as various materials for tire carcass cord; namely, rayon, polyester, glass fibers, metallic wires, nylon, and vinylon. Cords made of rayon or polyester fibers are especially suitable for the reinforcing plies of the toroidal shell 82 of the hollow core 8 to be used in the process according to the present invention.

As pointed out in the foregoing, it is of prime importance to maintain accuracy in dimensions of the hollow core 8 throughout the molding operations. The accuracy in dimensions of the hollow core 8 during the molding operations can be kept by pressurizing the inside of the core. As a result of numerous tests and analytical studies based on the theory of thin shells. It has been found that the cross sectional shape of such a toroidal shell is theoretically determined by the following Equation (1) on the assumption that the cords in the core are inextensible under the deformations caused by the pressure.

$$y = \int_{R}^{R_o} \frac{(R_m^2 - R^2)\sqrt{(R_o^2 - R^2\cos^2\alpha_o)}}{\sqrt{(R_m^2 - R_o^2)^2 R_o^2 \sin^2\alpha_o - (R_m^2 - R^2 5^2(R_o^2 - r^2 \cos^2\alpha_o)}} dR \quad (1)$$

here, y : One half of the width of the toroidal core, taken at right angles to a plane of outermost circumferential line about the center of symmetry of the core.

R : Radius from the center of symmetry of the core to that point of the core where the aforesaid core width is y.

$R_o$: Maximum radius of the hollow core, in terms of the distance from the aforesaid center of symmetry of the toroidal core to the outermost circumference of the toroidal core.

$R_m$: Radius from the aforesaid center of symmetry of the toroidal core to that point of the core where the aforesaid core width is maximum.

$\alpha_o$: Cord angle of the reinforcing layer cords, as defined as an angle between the aforesaid outermost circumferential line of the toroidal core and the cord of the reinforcing layer.

What is meant by the Equation (1) is that the cross sectional shape of the toroidal core 8, which is represented by the width y as a function of R, is determined by only three design factors: namely, the maximum radius $R_o$, the radius $R_m$ at the maximum width, and the cord angle $\alpha_o$ of the reinforcing ply cords at the outermost circumference of the core.

Instead of the aforesaid three design factors, some other factors may be used for defining the cross-sectional shape of the toroidal hollow core 8: for instance, the radius of the beads 85 and 85' as measured from the aforesaid center of the toroidal core 8, together with the aforesaid maximum radius $R_o$ and the cord angle $\alpha_o$. Spacing H between the two beads 85 and 85' may also be used as one of the design factors which define the cross sectional shape of the toroidal hollow core 8.

Although the cross sectional shape is almost determined by proper selection of the cord angle $\alpha_o$, in accordance with the Equation (1), it is often desirable to use additional elements to obtain the desired cross-sectional shape. Referring to FIG. 2, two stiffeners 84 and 84' extend from the beads 85 and 85' to the position of the aforesaid maximum core width, respectively. If the shape of the stiffeners 84 and 84' are suitably selected, the stability of the profile or the cross sectional shape of the toroidal core 8 can be ensured under pressurized operating conditions. The material for the stiffeners 84 and 84' is, for instance, hard rubber, other hard rubber material, or synthetic resin which has a Shore hardness of not smaller than 60°. The stiffeners 84 and 84' may be so tapered that their thickness diminishes as they extend from the beads 85 and 85' to the maximum core width position. Suitable fillers may be added in the stiffeners for improving their hardness.

To ensure the accurate outer peripheral shape of the core 8, an outer rubber layer 81 may be applied to the outer surface of the toroidal shell 82, as shown in FIG. 2. The outer rubber layer 81 may be 1 mm to 6 mm thick, and its outer peripheral surface may be shaped by grinding, so as to produce the desired shape with an accuracy in the order of 0.5 mm.

In operation, the internal pressure of the hollow core 8 should be higher than that of the fluidized tire-making material, which is poured in the molding cavity between the core 8 and the outer mold 6. If the inside pressure of the core 8 is too low, the core 8 may be deformed by the pressure of the tire-making material to be molded. The internal pressure of the core 8 for the tire molding operation is, for instance, 0.5 Kg/cm² to 5.0 Kg/cm².

When a high internal pressure is used in the core 8, due care must be taken to prevent gas leakage from the inside of the core 8 through the joint between the ring mold 7 and the core 8, because such gas leakage may cause voids in the cast tire 5. To eliminate such gas leakage, the embodiment of FIG. 2 uses a lining layer 83 applied to the inner surface and the ring mold-engaging portions of the core 8. The lining layer 83 is, of course, made of impermeable substance, such as a suitable high molecular substance having a low air or gas permeating ability. Preferably, the lining layer 83 extends to the outer peripheral surface of the core 8 through the ring mold-engaging portions, so that the outer edges of the lining layer 83 are integrally connected to the peripheral rubber layer 81. The thickness of the lining layer 83 is, for instance, 0.5 mm to 2 mm.

The beads 85 and 85' of the toroidal core 8 to be used in the process according to the present invention can be made of metallic wires, as in the case of conventional automobile tires. It is also possible to form the beads 85 and 85' with non-metallic materials, such as glass fibers, rayon, polyester, or a suitable organic or inorganic material capable of bearing the internal pressure of the core 8.

Figure 3:
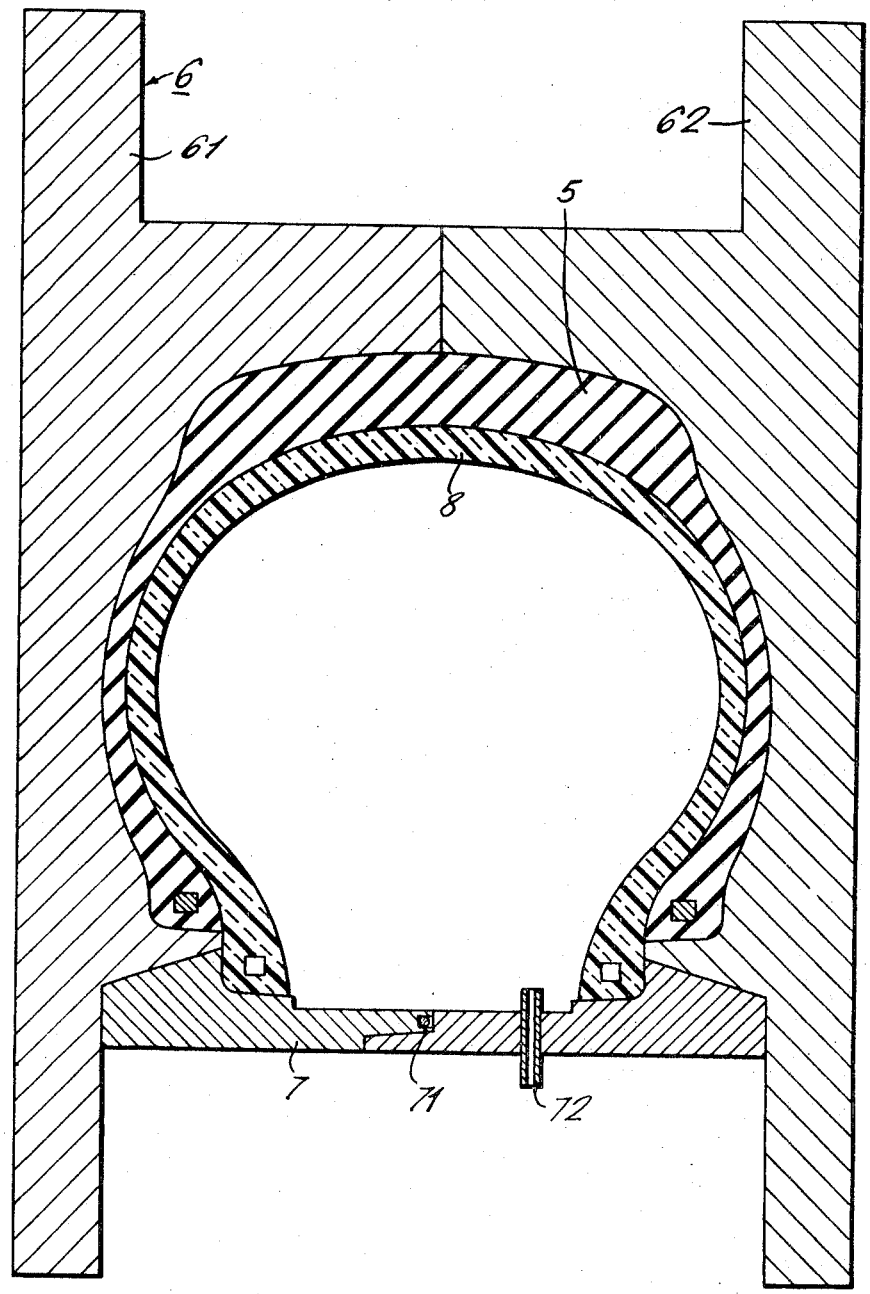
FIG. 3 is a modification of the mold assembly of FIG. 1.

FIG. 3 illustrates another mold assembly which can be used in accordance with the present invention. This mold assembly also uses a ring mold 7, together with an outer mold 6 and a toroidal core 8, but the ring mold 7 of FIG. 3 simply holds the toroidal core 8 and does not participate in the defining of the molding cavity of a desired cast tire 5. Since this ring mold 7 is free from the formation of the molding cavity, it is not required to be so accurate in dimensions, so that it can be manufactured at a comparatively low cost.

As described in the foregoing, according to the present invention, there is provided an improved apparatus for making cast tires, which simplifies the production of the cast tires while ensuring the smooth surfaces and desired shape of the cast tires.

What is claimed is:

1. A mold assembly for casting pneumatic tires, comprising an outer hard mold member made of at least two separable parts and defining a toroidal cavity, said toroidal cavity having a surface which defines the outer peripheral surface of a pneumatic tire to be cast, said toroidal cavity having an annular opening facing the center of symmetry of the toroidal cavity; a flexible toroidal core having a pair of spaced annular beads, stiffeners extending from the two beads to that portion of the toroidal core where the width of the core is maximum and having a Shore hardness of not smaller than 60° and a core-reinforced gastight shell extending between the two beads so as to form the toroidal shape of said core, said core being inserted into said toroidal cavity of said outer mold member, said toroidal core consisting of at least one reinforcing cord ply extending between said annular beads and biased at an angle of 20° to 50° relative to the equatorial direction of the toroidal core, an outer peripheral rubber layer applied to the outer surface of the cord ply, and a lining layer applied to the inner surface of the cord ply, said lining layer being impermeable to gas; a ring mold made of two halves and engaging said annular opening of said toroidal cavity of said outer mold member so as to sealingly close said toroidal cavity in a gastight manner, said ring mold member engaging said two beads of said toroidal core in a gas-tight manner; a pouring gate means in said outer mold member forming a passage for the introduction of fluidized tire-forming material into said molding cavity; and a gas valve means secured to said ring mold member and communicating with the inside spaces of said toroidal core; the inside space of said toroidal core being selectively pressurized by feeding a gas into said space through said valve to cause the outer peripheral surface of the pressurized toroidal core to define the inner surface of a pneumatic tire to be cast.

2. A mold assembly according to claim 1, wherein said cord ply is made of a material selected from the group consisting of rayon, polyester, glass fibers, metal wires, nylon, and vinylon.

3. A mold assembly according to claim 1, wherein said annular beads of said toroidal core are made of a material selected from the group consisting of rayon, polyester, glass fibers, metal wires, nylon, and vinylon.

4. A mold assembly according to claim 1, wherein the cords of the reinforcing layer of the toroidal core are disposed at right angles to the equatorial direction of the toroidal core.

5. A mold assembly according to claim 1, wherein said outer hard mold member is made of two halves which are separable along outermost circumferential line of said toroidal cavity about center of symmetry thereof.

6. A mold assembly according to claim 1, wherein said ring mold member forms a part of the molding cavity formed between said outer mold member and said toroidal core.

7. A mold assembly according to claim 1, wherein the molding cavity is formed exclusively by said outer mold member and said toroidal core.

8. A mold assembly according to claim 1, wherein said ring mold member is made of two separable halves.

* * * * *